(12) United States Patent
Cai et al.

(10) Patent No.: US 11,904,975 B2
(45) Date of Patent: Feb. 20, 2024

(54) FOLDING CAR FOR CHILDREN

(71) Applicant: Goodbaby Child Products Co., Ltd., Jiangsu (CN)

(72) Inventors: Hui Cai, Jiangsu (CN); Yu Ding, Jiangsu (CN)

(73) Assignee: Goodbaby Child Products Co., Ltd., Jiangsu (CN)

( * ) Notice: Subject to any disclaimer, the term of this patent is extended or adjusted under 35 U.S.C. 154(b) by 553 days.

(21) Appl. No.: 17/285,697

(22) PCT Filed: Dec. 18, 2018

(86) PCT No.: PCT/CN2018/121646
§ 371 (c)(1),
(2) Date: Apr. 15, 2021

(87) PCT Pub. No.: WO2020/077792
PCT Pub. Date: Apr. 23, 2020

(65) Prior Publication Data
US 2021/0291925 A1  Sep. 23, 2021

(30) Foreign Application Priority Data
Oct. 15, 2018 (CN) .......................... 201811193988.2

(51) Int. Cl.
*B62K 15/00* (2006.01)
(52) U.S. Cl.
CPC ........ *B62K 15/00* (2013.01); *B62K 2015/003* (2013.01)
(58) Field of Classification Search
CPC .......................... B62K 2015/003; B62K 15/00
See application file for complete search history.

(56) References Cited

U.S. PATENT DOCUMENTS 8,627,910 B1 * 1/2014 Carque ................. B62K 15/00
180/208
9,033,356 B2 * 5/2015 Xiao ....................... B62K 5/02
280/253

(Continued)

FOREIGN PATENT DOCUMENTS

CN      203222077 U      10/2013
CN      203638020 U       6/2014

(Continued)

OTHER PUBLICATIONS

International Patent Application No. PCT/CN2018/121646; Int'l Search Report; dated Jun. 27, 2019; 2 pages.

*Primary Examiner* — Kevin Hurley
*Assistant Examiner* — Hosam Shabara
(74) *Attorney, Agent, or Firm* — Shook, Hardy & Bacon L.L.P.

(57) ABSTRACT

Disclosed is a folding car for children. The folding car comprises a rear frame, rear frame is connected with a seat; a front frame connected to the rear frame in a back-and-forth movable manner; a front lateral rod, a front portion of which is rotatably connected with the front frame; a rear lateral rod rotatably connected to the front lateral rod and the rear frame; a pedal rod rotatably connected to the front frame; and a connecting rod connected with the rear frame in a back-and-forth movable manner, and a front portion of the connecting rod being connected with the pedal rods in a slidable and rotatable manner. The folding car for children realizes the folding of a seat-type scooter for children, has a simple and new overall structure, is convenient to fold and has a small volume after being folded.

13 Claims, 8 Drawing Sheets

(56) References Cited

U.S. PATENT DOCUMENTS

| | | | | |
|---|---|---|---|---|
| 10,933,938 B2* | 3/2021 | Mazar | ............... | B62K 13/04 |
| 11,505,237 B2* | 11/2022 | Cai | ............... | B62K 5/027 |
| 2022/0063752 A1* | 3/2022 | Zhu | ............... | B62M 1/14 |

FOREIGN PATENT DOCUMENTS

| CN | 205311787 U | 6/2016 |
|---|---|---|
| CN | 106240726 A | 12/2016 |
| CN | 207955896 U | 10/2018 |
| WO | WO 2007/032629 A1 | 3/2007 |

* cited by examiner

FOLDING CAR FOR CHILDREN

The present U.S. Patent Application is a U.S. National Phase Application under 35 U.S.C. 371 of International Application PCT/CN2018/121646 filed on Dec. 18, 2018, which claims priority to Chinese Patent Application No. 201811193988.2 filed on Oct. 15, 2018, the entire disclosures of which are incorporated herein by reference in their entireties.

TECHNICAL FIELD OF THE INVENTION

The present disclosure relates to a folding car for children, which belongs to toys for children.

BACKGROUND OF THE INVENTION

Folding car for children is a kind of toy driven by children, which generally includes a car body, wheels, a seat, etc., which are driven by a motor or a child's pedaling, and a transmission mechanism drives the wheels to rotate. And for the convenience of carrying and storing, it is designed as a foldable structure. Children's cars usually have a slipping function, and most of the folding car for children with slipping function have a vertical structure, and in the prior art, there is no folding design for children's car with a sitting structure.

SUMMARY OF THE INVENTION

To solve the above technical problems, the purpose of the present disclosure is to provide a folding car for children.

To achieve the above purpose, the technical solution employed by the present disclosure is: a folding car for children, comprises
- a rear frame, a bottom of which is connected with wheels, and the rear frame being connected with a seat;
- a front frame, which is connected to the rear frame in a back-and-forth movable manner;
- a front lateral rod, a front portion of which is rotatably connected with the front frame;
- a rear lateral rod, an outer end portion of which is rotatably connected to a rear portion of the front lateral rod, and an inner end portion of the rear lateral rod being rotatably connected with the rear frame, and the outer end portion of the rear lateral rod or the rear portion of the front lateral rod being connected with a rear lateral wheel.

Further, both the front frame and the rear frame extend along a front-rear direction, and the front frame is slidably connected with the rear frame.

Further, the front frame is inserted into the rear frame from front to rear from a front end of the rear frame, the rear frame is opened with a guide groove, and a first rotating shaft between the front frame and the front lateral rod is arranged in the guide groove in a back-and-forth slidable manner.

Further, the folding car for children further comprises a pedal rod rotatably connected to the front frame, and a connecting rod connected with the rear frame in a back-and-forth movable manner, and a front portion of the connecting rod is connected with the pedal rod in a slidable and rotatable manner.

More further, the pedal rod is connected with a second rotating shaft, and the second rotating shaft is slidably arranged at the front portion of the connecting rod.

More further, the second rotating shaft slides along a left-right direction.

More further, the front portion of the connecting rod is opened with a sliding groove, and the second rotating shaft is slidably arranged in the sliding groove.

More further, the front portion of the connecting rod has a connector extending in the left-right direction, and the sliding groove is provided on the connector.

More further, the rear frame comprises an inserted tube, and the connecting rod is inserted from front to rear from a front end of the inserted tube.

Further, there are respectively two front lateral rods and two rear lateral rods which are symmetrically provided on left and right sides of the front frame and the rear frame, respectively.

More further, the connecting rod is located on a symmetry plane of the folding car for children.

Further, the wheels comprise a rear wheel connected to a rear portion of the bottom of the rear frame, and front lateral wheels connected on left and right sides of the rear frame and located in front of the rear wheel.

Further, a plurality of sliding positions are provided between the front frame and the rear frame is provided with, and a position limiting mechanism for locking the two in a corresponding sliding position is provided between the front frame and the rear frame.

Due to the use of the above technical solutions, the folding car for children of the present disclosure realizes the folding of a seat-type scooter for children by means of a linkage, has a simple and new overall structure, is convenient to fold and has a small volume after being folded.

Figure 1:
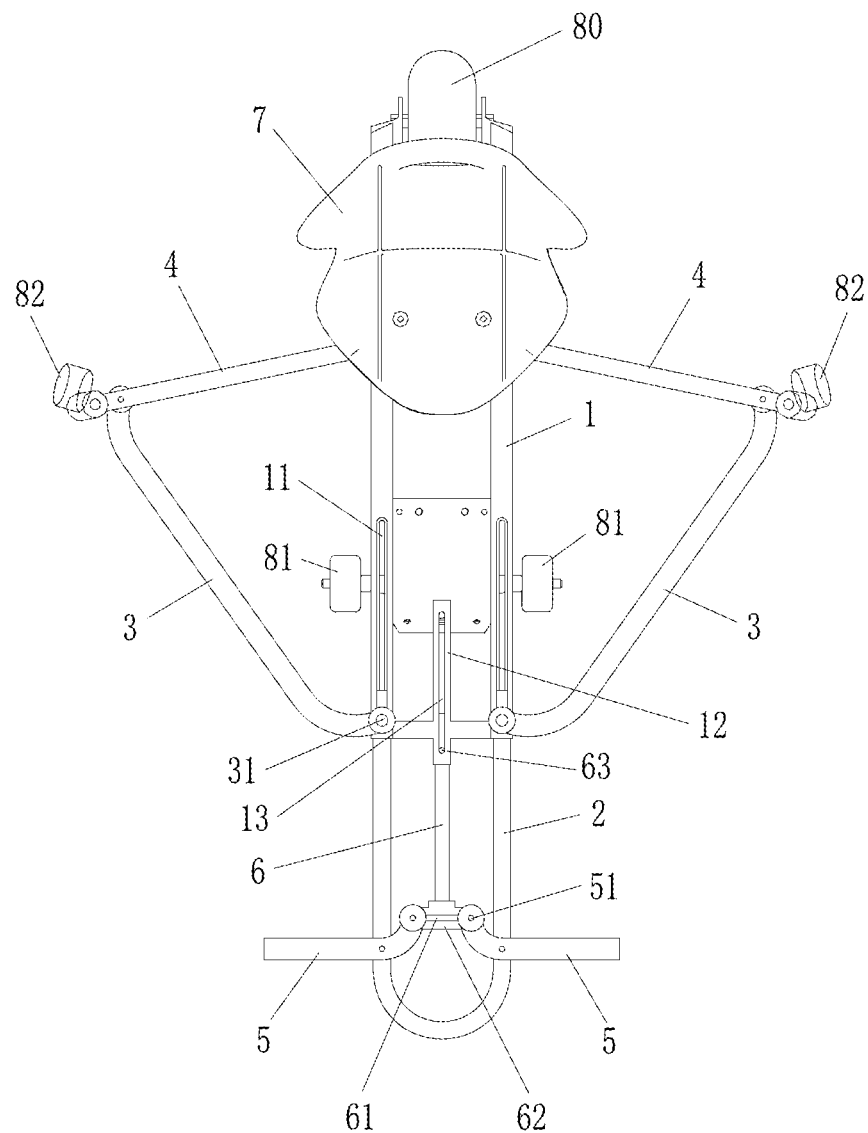
FIG. 1 is a schematic structure diagram of a folding car for children of the present disclosure in an unfolded state.

The reference symbols in the figures are:
1, rear frame; 11, guide groove; 12, inserted tube; 13, first sliding groove; 2, front frame; 3, front lateral rod; 31, first rotating shaft; 4, rear lateral rod; 5, pedal rod; 51, second rotating shaft; 6, connecting rod; 61, second sliding groove; 62, connector; 63, pin; 7, seat; 80, rear wheel; 81, front lateral wheel; 82, rear lateral wheel.

DETAILED DESCRIPTION OF EXEMPLARY EMBODIMENTS

In the following, the preferable embodiments of the present disclosure are explained in detail combining with the accompanying drawings so that the advantages and features of the present disclosure can be easily understood by the skilled persons in the art.

Referring to FIG. 1 to FIG. 8, a folding car for children in this embodiment, comprises a rear frame 1, a front frame 2, a front lateral rod 3 and a rear lateral rod 4.

The bottom of the rear frame 1 is connected with wheels, specifically, the wheels comprise a rear wheel 80 connected to the rear portion of the bottom of the rear frame 1, and front lateral wheels 81 connected on left and right sides of the rear frame 1 and located in front of the rear wheel 80. The folding car for children in this embodiment is driven by a motor, and the rear wheel 80 is a driving wheel. The rear frame is connected with a seat 7, specifically, the seat 7 is located above the rear wheel 80.

The front frame 2 is connected to the rear frame 1 in a back-and-forth movable manner. Specifically, the front frame 2 and the rear frame 1 both extend along a front-rear direction, and the front frame 2 is U-shaped with an opening facing rear. The front frame 2 is inserted into the rear frame 1 from front to rear from the front end of the rear frame 1.

A front portion of the front lateral rod 3 is rotatably connected with the front frame 2. Specifically, the front frame 2 is rotatably connected with the front lateral rod 3 via a first rotating shaft 31, the rear frame 1 is opened with a guide groove 11, and the first rotating shaft 31 is arranged in the guide groove 11 in a back-and-forth slidable manner.

An outer end portion of the rear lateral rod 4 is rotatably connected to a rear portion of the front lateral rod 3, and an inner end portion of the rear lateral rod 4 is rotatably connected with the rear frame 1. It should be noted that, the inner and outer directions in this embodiment refer to: the direction close to a symmetry plane P of the folding car for children is inner, and the direction away from the symmetry plane P of the folding car for children is outer. The outer end portion of the rear lateral rod 4 or the rear portion of the front lateral rod 3 is connected a rear lateral wheel 82, in this embodiment, the rear lateral wheel 82 is connected to the outer end portion of the rear lateral rod 4.

In a more preferred implementation, the folding car for children further comprises a pedal rod 5 and a connecting rod 6.

The pedal rod 5 is rotatably connected with the front frame 2. Specifically, the pedal rod 5 is located in the front of the front frame 2.

The connecting rod 6 is connected with the rear frame 1 in a back-and-forth movable manner, specifically, the connecting rod 6 is located on the symmetry plane P of the folding car for children. The rear frame 2 has an inserted tube 12 that is also located on the symmetry plane P of the folding car for children, and the connected rod 6 is inserted into the inserted tube 12 from front to rear from the front end of the inserted tube 12. The extension direction of the inserted tube 12 is consistent with the extension direction of the guide groove 11.

In a more preferred implementation, the inserted tube 12 is opened with a first sliding groove 13, the connected rod 6 is provided with a pin 63, the pin 63 is arranged in the first sliding groove 13 in a back-and-forth slidable manner, and through the cooperation of the pin 63 and the first sliding groove 13, it can not only play the role of sliding guide between the inserted tube 12 and the connecting rod 6, but also play the role of position limiting, and when the folding car for children is in an unfolded state, the pin 63 is in the front end portion of the first sliding groove 13, and when the folding car for children is in a folded state, the pin 63 is in the rear end portion of the first sliding groove 13. A front portion of the connecting rod 6 is connected with the pedal rod 5 in a slidable and rotatable manner. The connection between the connecting rod 6 and the pedal rod 5 is located behind the connection between the front frame 2 and the pedal rod 5. Specifically, an inner end portion of the pedal rod 5 is connected with a second rotating shaft 51, and the second rotating shaft 51 is slidably arranged at the front portion of the connecting rod 6. More specifically, the front portion of the connecting rod 6 is opened with a sliding groove 61, and the second rotating shaft 51 is slidably arranged in the sliding groove 61. The second rotating shaft 51 in this embodiment extends along a left-right direction, the front portion of the connecting rod 6 has a connector 62 extending in the left-right direction, and the sliding groove 61 is opened on the connector 62.

There are respectively two front lateral rods 3, two rear lateral rods 4 and two pedal rods 5 mentioned above, which are symmetrically provided on left and right sides of the front frame 2 and the rear frame 1, respectively.

In a more preferred implementation, the pedal rods 5 between the connections between the pedal rods 5 and the front frame 2 and the second rotating shafts 51 are arc curved, so that after the folding car for children is folded, the pedal rods 5 on left and right rides and the connector 61 are U-shaped together, so that the pedal rods 5 fits the front frame 5 more closely after being folded.

After the folding car for children with this structure is folded, the front lateral rods 3 on the left and right sides are respectively located at the outermost sides of left and right sides of the car body, therefore, in a more preferred implementation, both the front portions and the rear portions of the front lateral rods 3 are bend inwards, so that after the folding car for children is folded, the two sides of the car body have no excessively protruding edges and corners to prevent scratching.

The folding car for children further comprises a locking device for locking the whole car in an unfolded state.

In a more preferred implementation, a plurality of sliding positions are provided between the front frame 2 and the rear frame 1, and a position limiting mechanism for locking the two in a corresponding sliding position is provided between the front frame 2 and the rear frame 1. The position limiting mechanism can adopt existing technical structures such as pin-hole fitting. By providing a plurality of sliding positions between the front frame 2 and the rear frame 1, the distance between the pedal rods 5 and the seat 7 can be adjusted to accommodate children of different heights.

Figure 2:
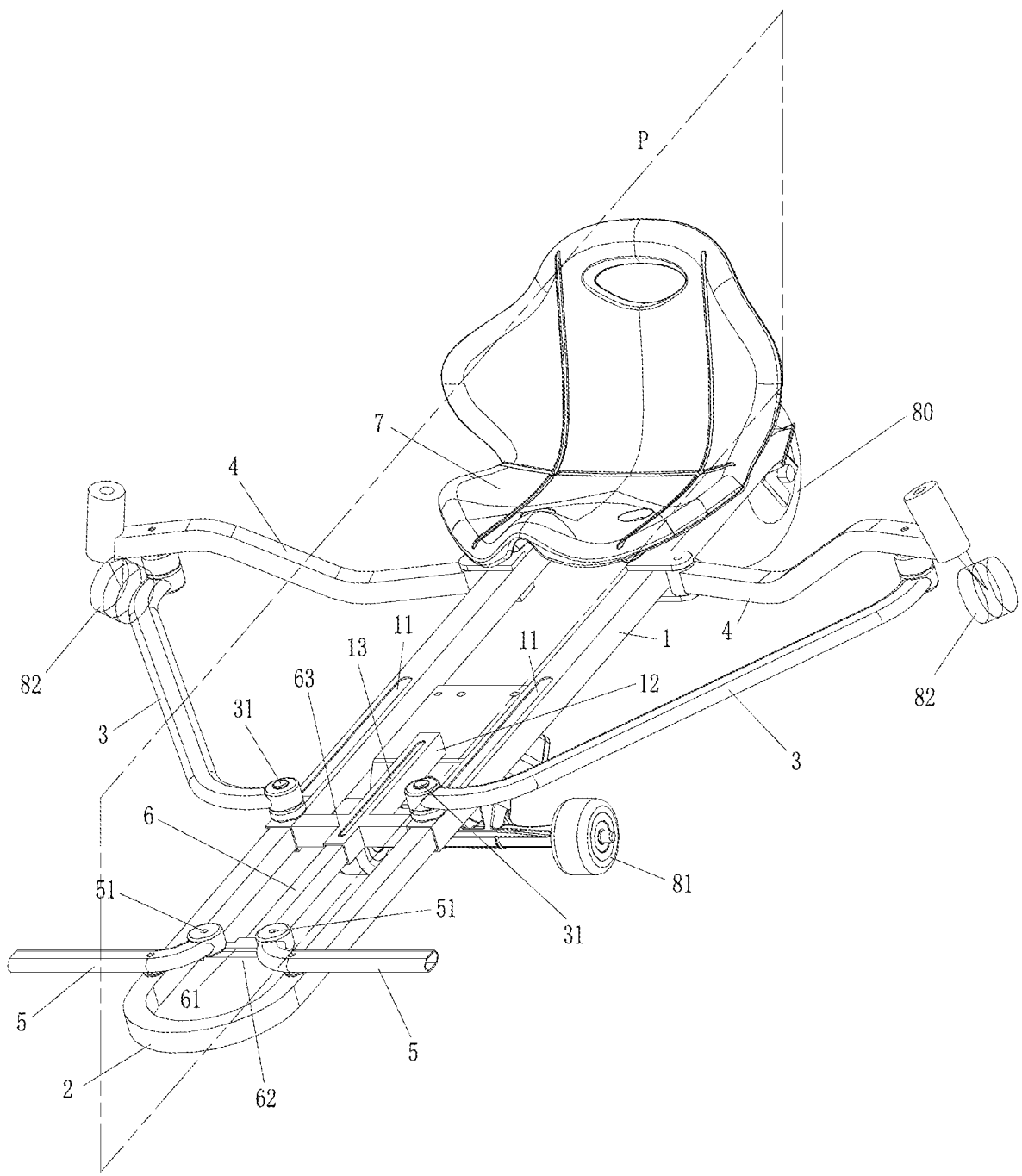
FIG. 2 is a schematic diagram of the three-dimensional structure of FIG. 1.
Figure 3:
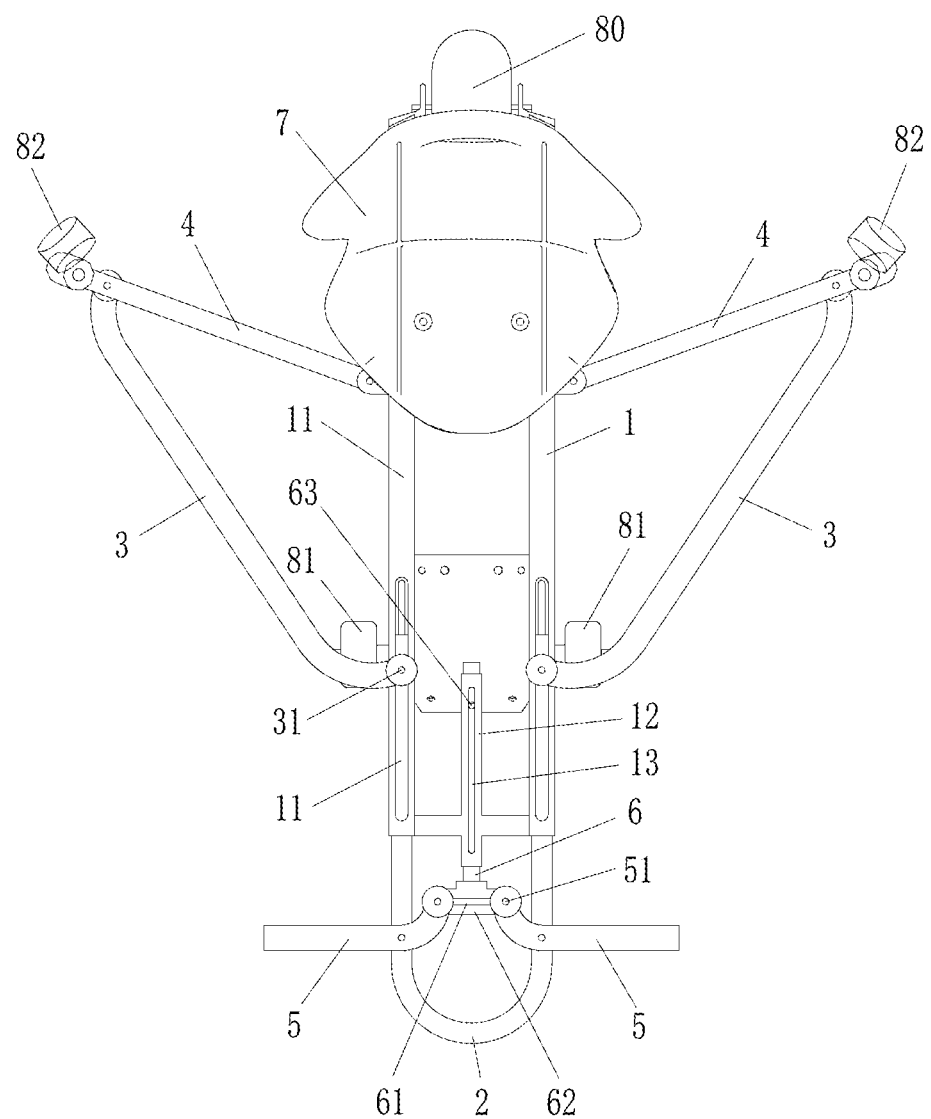
FIG. 3 is a schematic structure diagram of a folding car for children of the present disclosure during folding.
Figure 4:
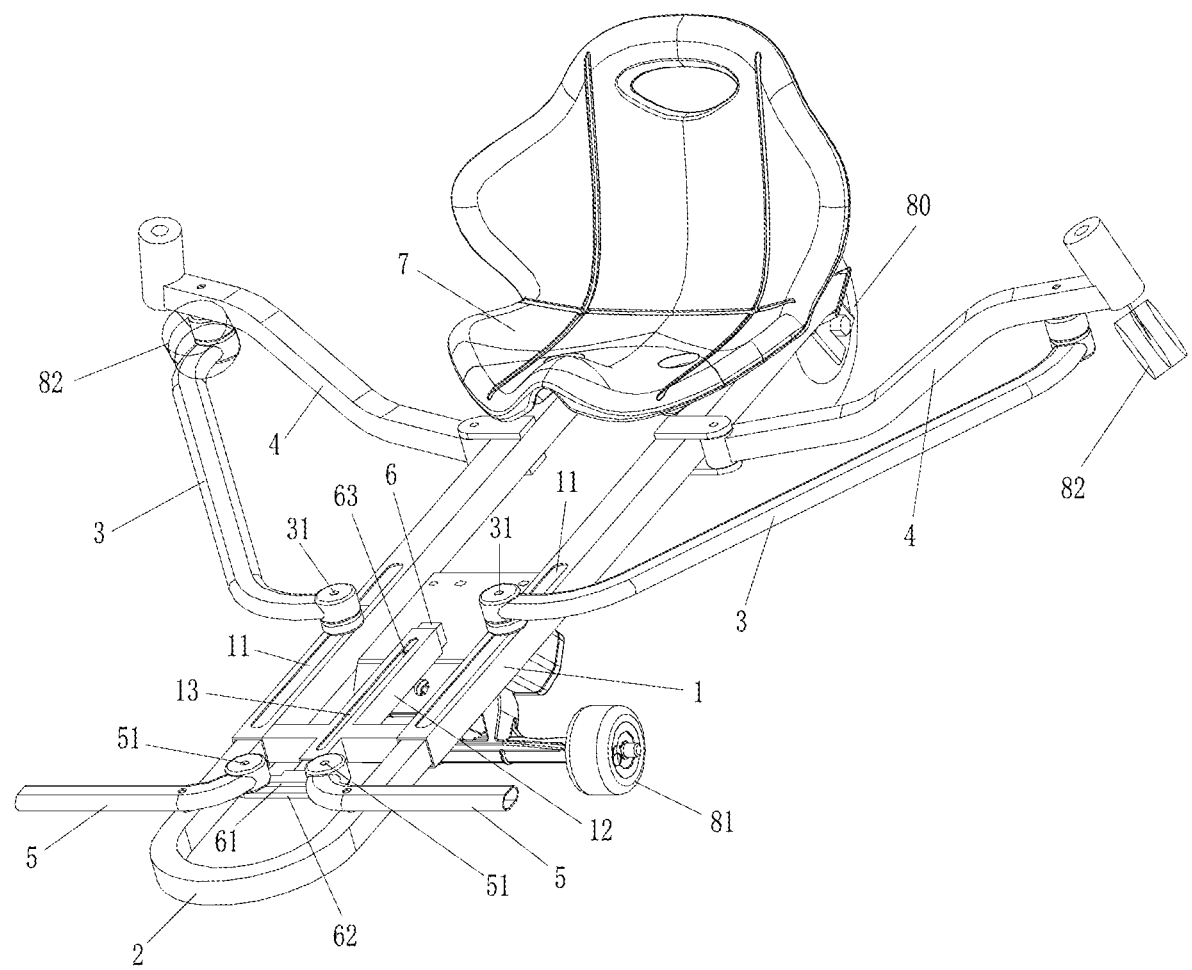
FIG. 4 is a schematic diagram of the three-dimensional structure of FIG. 3.
Figure 5:
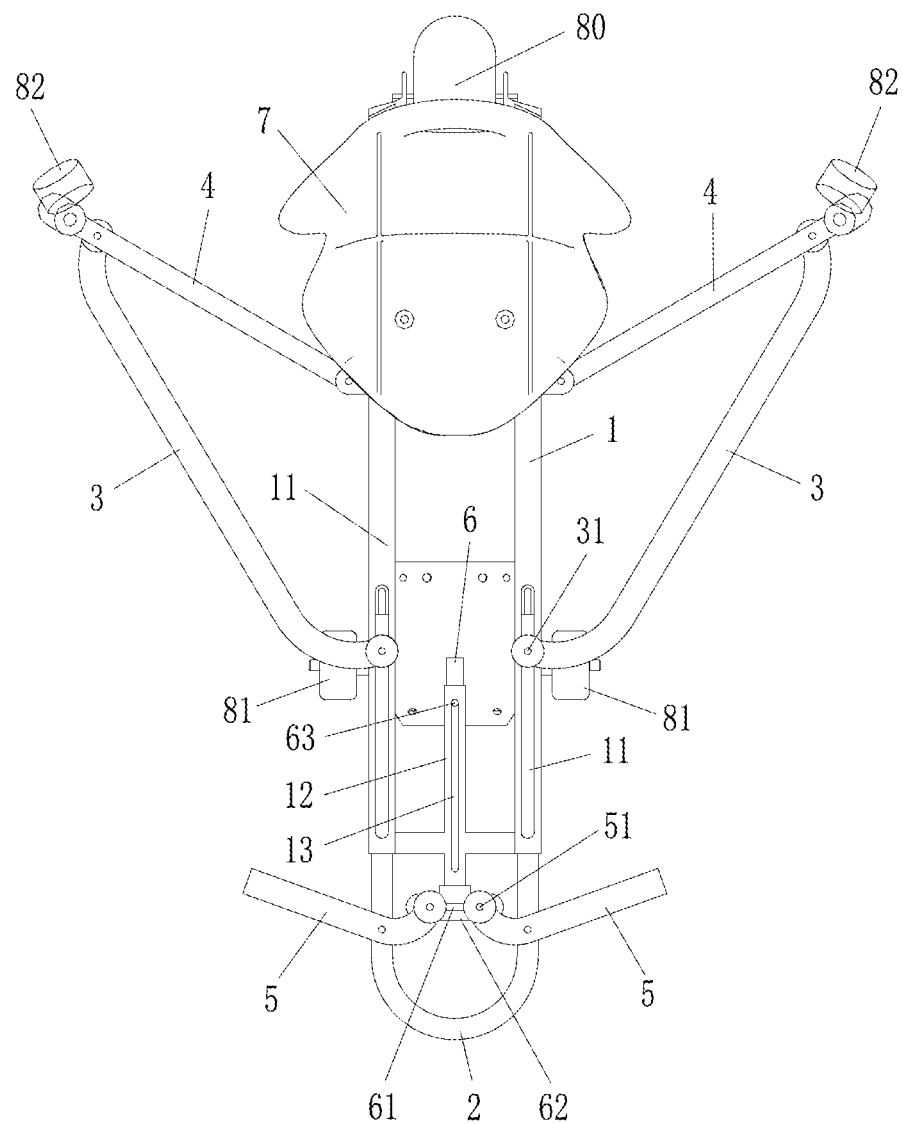
FIG. 5 is a schematic structure diagram of the folding car for children of the present disclosure being further folded on basis of FIG. 2.
Figure 6:
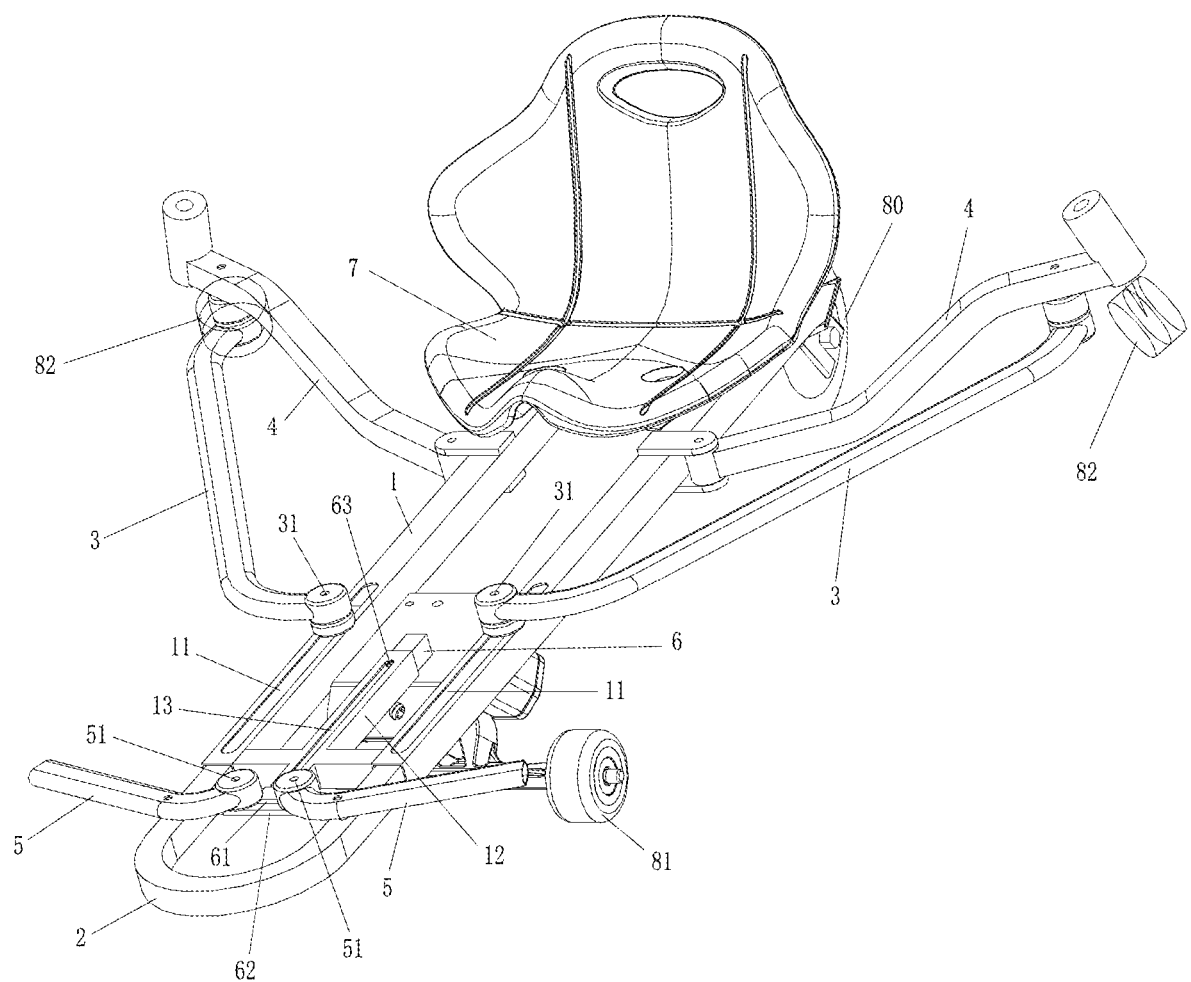
FIG. 6 is a schematic diagram of the three-dimensional structure of FIG. 5.
Figure 7:
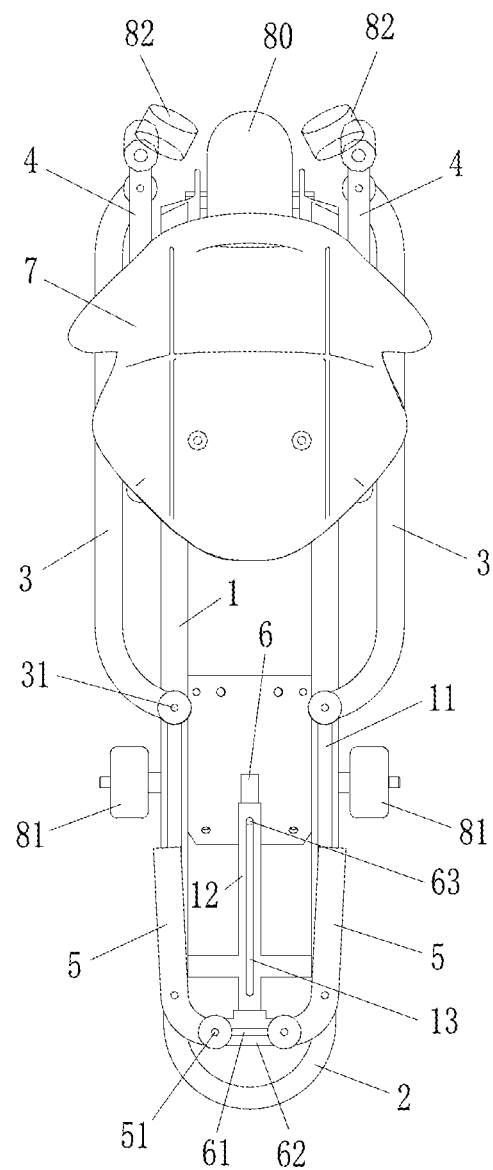
FIG. 7 is a schematic structure diagram of a folding car for children of the present disclosure in a folded state.
Figure 8:
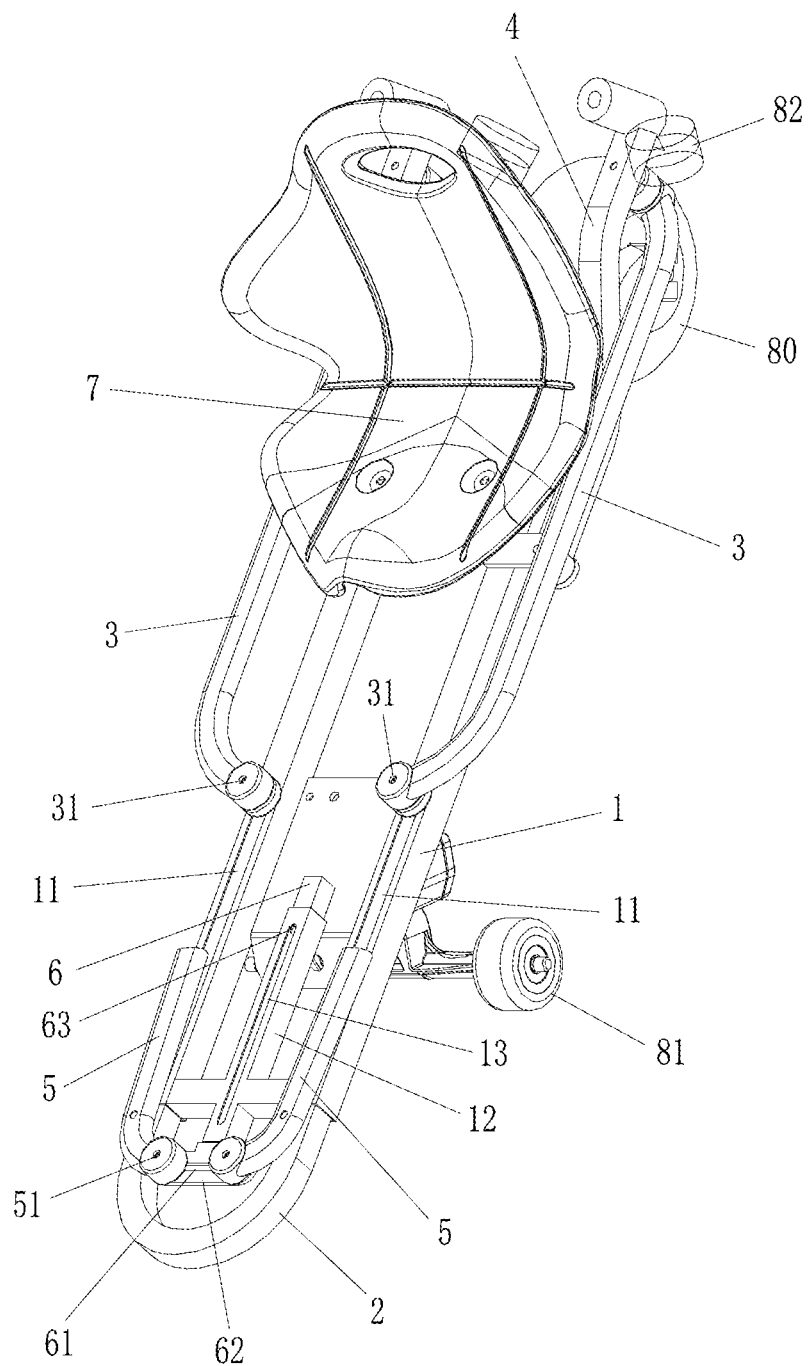
FIG. 8 is a schematic diagram of the three-dimensional structure of FIG. 1.

Working Principle:

When the folding car for children is in the unfolded state, as shown in FIG. 1 and FIG. 2, the pedal rods 5 extend in the left-right direction, and the front lateral rods 3 and the rear lateral rods 4 on left and right sides respectively present wing shapes on left and right sides of the rear frame 1. When it needs to fold, as shown in FIG. 3 and FIG. 4, the front frame 2 is pushed rearward to gradually insert the front frame 2 into the rear frame 1 so as to drive the front lateral rods 3 and the rear lateral rods 4 to rotate rearward and get close to the rear frame 1, and while the front frame 2 is moved rearward, the connecting rod 6 is driven to move rearward through the pedal rods 5 and inserted into the inserted tube 12; the front frame 2 is further pushed rearward, as shown in FIG. 5 and FIG. 6, the connector 62 on the front of the connecting rod 6 abuts against on the front end of the inserted tube 12, the connecting rod 6 is no longer moved rearward, the front frame 2 continues to move rearward to drive the pedal rods 5 to rotate rearward, and the pedal rods 5 on left and right sides are respectively moved close to left and right sides of the front frame 2, until the whole car is completely folded, as shown in FIG. 7 and FIG. 8.

The folding car for children realizes the folding of a seat-type scooter for children by means of a linkage, has a simple and new overall structure, is convenient to fold and has a small volume after being folded.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

The invention claimed is:

1. A folding car for children, comprising
a rear frame, a bottom of which is connected with wheels, and the rear frame is connected with a seat;
a front frame, which is connected to the rear frame in a back-and-forth movable manner;
a front lateral rod, a front portion of which is rotatably connected with the front frame;
a rear lateral rod, an outer end portion of which is rotatably connected to a rear portion of the front lateral rod, and an inner end portion of the rear lateral rod being rotatably connected with the rear frame, and the outer end portion of the rear lateral rod or the rear portion of the front lateral rod being connected with a rear lateral wheel.

2. The folding car for children according to claim 1, wherein the front frame and the rear frame both extend along a front-rear direction, and the front frame is slidably connected with the rear frame.

3. The folding car for children according to claim 1, wherein the front frame is inserted into the rear frame from front to rear from a front end of the rear frame, the rear frame is opened with a guide groove, the front frame and the front lateral rod are rotatably connected via a first shaft, and the first rotating shaft is arranged in the guide groove in a back-and-forth slidable manner.

4. The folding car for children according to claim 1, wherein the folding car for children further comprises a pedal rod rotatably connected to the front frame, and a connecting rod connected with the rear frame in a back-and-forth movable manner, and a front portion of the connecting rod is connected with the pedal rod in a slidable and rotatable manner.

5. The folding car for children according to claim 4, wherein the pedal rod is connected with a second rotating shaft, and the second rotating shaft is slidably arranged at the front portion of the connecting rod.

6. The folding car for children according to claim 5, wherein the second rotating shaft (51) slides along a left-right direction.

7. The folding car for children according to claim 5, wherein the front portion of the connecting rod is opened with a sliding groove, and the second rotating shaft is slidably arranged in the sliding groove.

8. The folding car for children according to claim 7, wherein the front portion of the connecting rod has a connector extending in the left-right direction, and the sliding groove is opened on the connector.

9. The folding car for children according to claim 4, wherein the rear frame comprises an inserted tube, and the connected rod is inserted into the inserted tube from front to rear from a front end of the inserted tube.

10. The folding car for children according to claim 1, wherein there are respectively two front lateral rods and two rear lateral rods, which are symmetrically provided on left and right sides of the front frame and the rear frame, respectively.

11. The folding car for children according to claim 4, wherein the connecting rod is located on a symmetry plane of the folding car for children.

12. The folding car for children according to claim 1, wherein the wheels comprise a rear wheel connected to a rear portion of the bottom of the rear frame, and front lateral wheels connected on left and right sides of the rear frame and located in front of the rear wheel.

13. The folding car for children according to claim 1, wherein a plurality of sliding positions are provided between the front frame and the rear frame, and a position limiting mechanism for locking the two in a corresponding sliding position is provided between the front frame and the rear frame.

* * * * *